(12) United States Patent
Zinn et al.

(10) Patent No.: US 10,481,017 B2
(45) Date of Patent: Nov. 19, 2019

(54) TEMPERATURE PROBE

(71) Applicant: ANSALDO ENERGIA SWITZERLAND AG, Baden (CH)

(72) Inventors: Hanspeter Zinn, Baden-Rütihof (CH); Joerg Rinn, Untersiggenthal (CH); Mark Clark, Rainham (GB)

(73) Assignee: Ansaldo Energia Switzerland AG, Baden (CH)

( * ) Notice: Subject to any disclaimer, the term of this patent is extended or adjusted under 35 U.S.C. 154(b) by 154 days.

(21) Appl. No.: 15/691,210

(22) Filed: Aug. 30, 2017

(65) Prior Publication Data

US 2018/0058951 A1    Mar. 1, 2018

(30) Foreign Application Priority Data

Aug. 31, 2016  (EP) .................................... 16186709

(51) Int. Cl.
| | | |
|---|---|---|
| *G01K 1/00* | (2006.01) | |
| *G01K 13/00* | (2006.01) | |
| *G01K 7/00* | (2006.01) | |
| *G01K 13/02* | (2006.01) | |
| *G01M 15/14* | (2006.01) | |

(52) U.S. Cl.
CPC ........... *G01K 13/02* (2013.01); *G01K 13/028* (2013.01); *G01M 15/14* (2013.01); *G01K 2013/024* (2013.01); *G01K 2205/04* (2013.01)

(58) Field of Classification Search
USPC ................ 374/144, 166, 148, 138, 163, 208
See application file for complete search history.

(56) References Cited

U.S. PATENT DOCUMENTS

| | | | | |
|---|---|---|---|---|
| 2,930,827 | A | * | 3/1960 | Schunke ................ G01K 13/02 136/224 |
| 4,467,134 | A | * | 8/1984 | Pustell ................... G01K 13/02 136/230 |
| 5,718,512 | A | * | 2/1998 | Ngo-Beelmann ...... G01K 13/02 136/230 |
| 5,812,588 | A | | 9/1998 | Deak et al. |
| 2005/0281312 | A1 | | 12/2005 | Chana |
| 2007/0153870 | A1 | | 7/2007 | Miliani et al. |

(Continued)

FOREIGN PATENT DOCUMENTS

| | | |
|---|---|---|
| EP | 0 777 115 A1 | 6/1997 |
| GB | 2 395 561 A | 5/2004 |
| WO | WO 2005/064295 A1 | 7/2005 |

*Primary Examiner* — Mirellys Jagan
(74) *Attorney, Agent, or Firm* — Buchanan Ingersoll & Rooney PC

(57) ABSTRACT

A temperature probe and method for determining a temperature in a gas flow are disclosed. The probe includes a probe body. A free flow temperature sensor a free flow temperature of the gas flow and a total temperature sensor measures a total temperature of the gas flow. The method includes measuring a flow temperature in a free gas flow, providing a static gas volume in which essentially all kinetic energy of the flowing gas is recovered and converted into thermal energy, and measuring a total temperature in the static gas volume. An accurate determination of the total temperature of a gas flow, which is representative of a specific total enthalpy, can thereby be achieved while detecting fast and transient temperature changes.

19 Claims, 2 Drawing Sheets

(56) References Cited

U.S. PATENT DOCUMENTS

2007/0242725 A1* 10/2007 Kitahara ............... G01F 1/6842
374/42
2011/0317740 A1* 12/2011 Ireland .................. G01K 13/02
374/179
2015/0103863 A1* 4/2015 Herman ............... G01K 13/028
374/138

* cited by examiner

TEMPERATURE PROBE

PRIORITY CLAIM

This application claims priority from European Patent Application No. 16186709.8 filed on Aug. 31, 2016, the disclosure of which is incorporated by reference.

TECHNICAL FIELD

The present disclosure relates to a temperature probe as set forth in claim 1. It further relates to a gas turbine engine comprising at least one temperature probe of the kind described provided in an exhaust diffuser of the gas turbine engine. Further, a method for determining a temperature in a gas flow is disclosed.

BACKGROUND OF THE DISCLOSURE

Measurements of the temperature of flowing fluids are required in many technical applications. However, when measuring the temperature of a gas flow the measured temperature will depend on the flow velocity, as a part of the gas enthalpy is provided as kinetic energy. Dependent on the flow velocity this might lead to substantial errors when the enthalpy of the flowing gas is of interest.

For instance temperature measurements are applied in the exhaust flow of gas turbine engines. Various thermodynamic parameters of the engine working cycle are deducted from the measured temperature of the exhaust flow. For one instance, it is common to deduct a turbine inlet temperature from the measured exhaust gas temperature and the pressure ratio of the working cycle. A probe for temperature measurement in an exhaust duct of a gas turbine engine is for instance disclosed in EP 0 777 115. It is evident that in this respect the enthalpy of the exhaust gas is of interest, and the measurement of the exhaust temperature is intended to indicate the specific enthalpy of the exhaust gas. It is readily appreciated that the higher the flow velocity is, the more substantially the specific enthalpy of the exhaust gas will be underestimated, resulting in consequently wrong estimations of any thermodynamic parameters derived therefrom.

The discrepancy between the specific enthalpy and the enthalpy derived from a mere temperature measurement which due to the velocity of the flowing gas is quadratically related to the flow velocity. Thus, at low flow velocities the error may be disregarded as being in the range of other inadvertent parameters influencing the measurement. Moreover, the accuracy of the calculated or computed parameters derived from the temperature measurements may not be influenced outside an expected confidence level. It may be said, in one instance, that at low Mach numbers, say below 0.2, said compressibility effects may be disregarded. However, at higher flow velocities, or Mach numbers, respectively, the resulting errors in representing the specific gas enthalpy by the measured temperature, or the miscalculation of resulting parameters, increase over-proportionally.

A remedy may be seen in measuring the gas temperature in a stagnation area of the gas flow. In a stagnation area the dynamic pressure head of the flow is converted into static pressure, the kinetic energy of the flow is converted into thermal energy, and in turn a temperature measured in an upstream flow stagnation area provides an accurate indication of the specific enthalpy. However, as by definition the gas in a stagnation area is not replaced, or in fact is replaced at a very low rate, changes of the gas temperature, or specific enthalpy, respectively, may only be detected with significant delay times. Certain applications, such as for instance control and protection of a gas turbine engine, may require an accurate total temperature measurement representative of the total enthalpy of a gas flow, as well as a fast measurement in order to detect transient effects with low delay time.

Lineout of the Subject Matter of the Present Disclosure

It is an object of the present disclosure to provide a temperature probe and a method for determining a temperature in a gas flow. In one aspect, a temperature probe is disclosed which provides an improvement over temperature probes known from the art. In another aspect the temperature probe shall enable to determine the total temperature, and in turn to provide an indication of the specific enthalpy of the flowing gas, with improved accuracy, and independent from the flow velocity. In still another aspect, the temperature probe and the method shall enable the detection of fast and transient temperature changes. In a more specific aspect, an accurate measurement of the total temperature as well as the detection of fast and transient temperature changes shall be enabled.

This is achieved by the subject matter described in claim 1, and further by the method as described in the independent method claim.

In further aspects set forth in more detail below, the circumstance may be considered to provide the probe such that the total temperature may be determined with high accuracy even if the flow towards the probe is in an off-design flow direction such that the measurement is at least largely insensitive to off-design flows over a wide range of off-design flow conditions, and even at comparatively high flow Mach numbers.

In other aspect, the robustness of the probe is addressed.

Further effects and advantages of the disclosed subject matter, whether explicitly mentioned or not, will become apparent in view of the disclosure provided below.

Accordingly, disclosed is a temperature probe for determining a temperature in a gas flow, the probe comprising a probe body and at least two temperature sensors. At least one temperature sensor is provided as a free flow temperature sensor to measure a free flow temperature of the gas flow and at least one temperature sensor is provided as a total temperature sensor to measure a total temperature of the gas flow, representative of the specific enthalpy, or at least to determine the total temperature of the gas with a high accuracy, that is, with a minimum error due to kinetic energy. It is noted that residual errors in determining the total temperature due to a residual velocity of the gas volume in which the total temperature is measured may be found negligible. This is due to the quadratic correlation between velocity and the related temperature reduction. Thus, a high flow velocity results in large discrepancies between the actually measured temperature and the total temperature, the latter representing the total specific enthalpy of the gas, lead to significant underestimations of the total specific enthalpy. Said error decreases rapidly with a decreasing flow velocity, and low residual velocities will not have a significant impact, and will easily fall well below the confidence level of the measurement as such and the related calculations, or computations, respectively. For instance, when considering the specific heat capacity of air at roughly 1 kJ/(kg K)=1000 m$^2$/(s$^2$ K), that of a typical gas turbine flue gas at roughly 1200 m$^2$/(s$^2$ K), a flow velocity of 10 m/s will lead to an error of the measured total temperature of about $\frac{1}{10}$ K, while a flow velocity of 100 m/s will lead to an underestimation by about 8 to 10 K, and at a flow velocity of 200 m/s the determined temperature will be, depending on the actual specific heat capacity, roughly 30 to 40 K lower than the total temperature. The skilled person will easily be able to determine the acceptable residual velocity at the location for determining the total temperature, in particular in considering the expected measurement accuracy and the impact on the thermodynamic cycle parameters of a gas turbine engine deducted from the measured temperature.

The sensors may comprise at least one of thermocouples, thermoresistors, or any other sensor type suitable for measurements in the intended temperature range. In other aspects the sensors are generally sensors which provide an electric signal correlated to the temperature detected by the sensor. In one aspect, the temperature sensors may be chosen such that their measurement range covers a typical temperature range present in the exhaust gas of a gas turbine engine. The skilled person will be able to determine the required temperature range.

Further, a method of determing a temperature in a gas flow is disclosed, the method comprising measuring a flow temperature in a free gas flow, providing at least one static gas volume in which at least essentially all kinetic energy of the flowing gas is recovered and converted into thermal energy, and measuring a total temperature in the static gas volume. The flow velocity in the static gas volume may for one instance be 20 m/s or less. Providing a static gas volume comprises decelerating the gas flow, thus at least essentially recovering the kinetic energy in the flow as thermal energy and thus raising the temperature of the gas in the static gas volume to a value accurately representative of the specific enthalpy of the gas. As to the extent to which the kinetic energy should be recovered, or an acceptable residual flow velocity in the static gas volume, reference is made to the considerations above. It is understood that the measurement of the free gas flow temperature and the measurement of the total temperature are in particular performed simultaneously.

A combination of both measurement signals, form the measurement in the free gas flow as well as in a static gas volume, enables on the one hand an accurate determination of the total temperature of a gas flow, which is representative of a specific total enthalpy, while at the same time enabling the detection of fast and transient temperature changes.

It is noted that the temperature detected by the total temperature sensor, or in the static gas volume, respectively, will only have a delayed response on changes of the total temperature. Changes of the total temperature due to varying flow velocities will be detected immediately by the total temperature sensor, as the change in recovered dynamic pressure head will immediately become effective in the static gas volume, resulting in the related temperature change which is proportional to the change in the kinetic part of the enthalpy of the flow. The fraction of an enthalpy change at constant flow velocity will be detected by the free flow sensor. Thus, an accurate temperature measurement representative of the total specific enthalpy of the gas flow is enabled, while at the same time fast temperature changes are detected.

In one more specific instance the free flow temperature sensor is located distant from the probe body. The distance and location of the free flow temperature sensor may be chosen such as to be provided outside any boundary layers of the probe body and outside any area in which stagnation of the flow becomes effective. Being provided in a free flow, the heat transfer between the flow and the free flow temperature sensor is at a high level. The free flow temperature sensor thus responds virtually without any delay to a temperature change of the free flow. It is understood that the free flow temperature sensor may be chosen sufficiently small in order to provide sufficiently low thermal inertia.

According to further aspects the probe body may be shaped to provide a flow stagnation area, the flow stagnation area being provided and configured to convert at least essentially all kinetic energy of an incoming flow into thermal energy, wherein the total temperature sensor is located in a gas volume in said stagnation area. Thus, the temperature detected by the total temperature sensor is the total temperature, representative of the total specific enthalpy of the gas flow. It is understood that the stagnation area should be provided sufficiently large, and the total temperature sensor should be provided at a sufficiently large distance from any walls delimiting the stagnation area, to avoid the total temperature sensor being provided in a thermal boundary layer which is caused by heat conduction in the probe body. The probe body will commonly be provided from outside a duct in which the gas flow is provided, and thus the probe will conduct heat from inside the duct to the outside. The probe body may further extent through flow areas of different gas temperature. While the resulting heat conduction may be small, the probe body may yet effect the temperature of the gas in the stagnation area. It will thus be appreciated that providing the stagnation area and placing the total temperature probe as lined out above will increase measurement accuracy. It will further be appreciated as advantageous to provide a certain, yet small, gas mass flow through the stagnation area, such that heat convection from the gas flow offsets potentially detrimental heat conduction to or from the probe. Further, the reaction time of the total temperature sensor is improved in providing the gas flow through the stagnation area.

Disclosed are embodiments of the probe in which only at least one flow stagnation area with a total temperature sensor provided therein is provided, while omitting the free flow temperature sensor. The at least one flow stagnation area may further be provided in accordance with any of the more specific features related to providing a flow stagnation area lined out below. As will become more apparent in the description provided below, it may be conceivable and appropriate to provide a multitude of probes in a flow duct, some of which are furnished with free flow temperature sensors while others are not and are only provided with total temperature sensors provided in stagnation areas.

It is noted, while it goes without saying, that stagnation areas which are provided at different locations at the probe in order to enable a spatially resolved measurement of the total temperature should be provided without fluid communication between the stagnation areas in order to avoid blurred measurements.

The stagnation area may in certain embodiments be provided as a stagnation cavity in the probe body. The stagnation cavity is in this case provided as a blind cavity and opens out to the exterior of the probe body with a flow receiving opening, the flow receiving opening being provided at one end of the stagnation cavity and a blind end being provided on an opposite end of the stagnation cavity. It is understood that the design condition is to place the stagnation cavity with the flow receiving opening upstream the flow of gas, and in particular arranging the flow receiving opening with a cross section thereof perpendicular to the incoming flow of gas. The edges provided on the body and delimiting the flow receiving opening may thus in certain embodiments be provided as rounded, smooth edges such as to avoid easy flow separation under off-design inflow conditions in an angular inflow range around the design condition, wherein it is strived to maintain the flow recovery factor, that is the portion of kinetic energy recovered as thermal energy in the transition area, at a constant high level of at or above say 90%, over a range of off-design inflow conditions as large as possible. For one non-limiting instance this range may be up to ±40°. In this respect it may moreover be found beneficial if a cross sectional dimension of the stagnation cavity is larger than for instance the depth of the stagnation cavity. In that the stagnation cavity is provided in the probe body, no fragile protruding elements need to be provided, thus enhancing the robustness and reliability of the probe. The total temperature sensor is provided in a well-protected manner inside the stagnation cavity, which further lowers damage risk of the probe.

In still a further aspect the stagnation cavity may be provided with one of a constant or tapering cross section from the flow receiving opening to the blind end. That is, the stagnation cavity does not comprise any undercut, thus further enhancing the recovery of kinetic energy into thermal energy for an accurate total temperature measurement.

At least one purge duct may be provided at a lateral delimiting surface of the stagnation cavity and be in fluid communication with the exterior of the probe body. With a nominal, design flow direction being defined perpendicular to a cross section of the flow receiving opening, the at least one purge duct may be provided at a lateral delimiting surface of the stagnation cavity and at an angle of at least 45° with respect to the nominal flow direction. Due to the presence of the purge duct, the stagnation cavity is purged by the gas flow at a purge rate. The cumulative flow cross section of all purge ducts may be at most ⅓ of the cross section of the flow receiving opening. The residual flow velocity inside the stagnation cavity due to a resulting purge flow is thus sufficiently low to not have a significant impact on the measured temperature inside the stagnation cavity, which only deviates insignificantly, for example 1 K or less, from the total temperature due to the residual flow velocity. On the other hand, as the gas volume inside the stagnation cavity is constantly replaced by incoming gas, the measurement reacts with reasonably low response times to actual changes of the gas specific total enthalpy. Moreover, the constant inflow of new gas results in a constant convective heat flow, thus compensating for potential conductive heat flow to or from the probe body.

While the free flow temperature sensor is provided at a distance from the probe body, a protective frame may be provided around the free flow temperature sensor. This serves to protect the free flow temperature sensor form mechanical damages, and further enhances the robustness and reliability of the probe. It goes without saying that the protective frame will be provided such as not to influence the free flow of gas around the free flow temperature sensor, at least in the nominal design flow direction of the probe and a significant range of off-design flow conditions.

The probe body itself may be provided as a longitudinal body, the longitudinal body comprising an attachment area and extending from the attachment area to a distal end along a body axis. In the attachment area a flange may be provided around the probe body. The probe body may in more particular embodiments be provided as longitudinal body of cylindrical, elliptical, or otherwise aerodynamically shaped cross section. It is understood that the probe is intended to be placed in a hot gas flow with its longitudinal or axial extent provided across a main flow direction, wherein it is intended that the probe causes as little flow resistance as possible.

A multitude of stagnation cavities with total temperature sensors provided therein may be distributed along the longitudinal extent of the probe body to allow for a spatially resolved measurement of a total temperature, or specific enthalpy, respectively, of the gas across the flow direction. For instance in the application of a measurement in the exhaust duct of a gas turbine engine the enthalpy flow in the exhaust duct is of primary interest. It may thus be found beneficial to provide the total temperature measurement such as to allow a characterization of spatial fluctuations of the specific total enthalpy in order to be able to make more accurate statements about the enthalpy flow.

The free flow temperature sensor may extend from the distal end of the probe body. It is understood that, while a multitude of total temperature sensors may be provided, one single free flow temperature sensor on a probe may be well sufficient. The measurement of the free flow temperature may be more of a qualitative one in order to detect the occurrence of transient temperature changes which may not be seized by the total temperature measurement but with a delay time due to the measurement in a stagnation area, or in a static or quasi-static, gas volume, respectively.

A stagnation cavity may be provided inside the probe body with a flow receiving opening being provided in a lateral wall of the probe body.

In certain embodiments a straight longitudinal duct extends from a proximal end of the probe body to a stagnation cavity. The total temperature sensor is attached to a sensor shaft, the sensor shaft extending through said straight longitudinal duct, wherein in particular a cross sectional dimension of the straight longitudinal duct is larger than a dimension of the total temperature sensor. This may apply to each total temperature sensor, and enables to replace a total temperature sensor from outside a duct in which the probe is inserted without removing the probe.

Likewise, a straight longitudinal duct may extend from a proximal end of the probe body to the distal end of the probe body. The free flow temperature sensor is attached to a sensor shaft, the sensor shaft extending through the straight longitudinal duct, wherein in particular a cross sectional dimension of the straight longitudinal duct is larger than a dimension of the free flow temperature sensor. This enables to replace a free flow temperature sensor from outside a duct in which the probe is inserted without removing the probe.

A sample extraction duct may extend from a proximal side of the probe body and proximal of the attachment area and is in fluid communication with a gas flow in which the probe is placed. Through said sample extraction duct samples, for instance for a gas analysis system and more in particular for an emission monitoring system, may be extracted from the gas flow. The sample extraction duct may be provided in fluid communication with a stagnation cavity. Thus, on the one hand sample extraction may be supported by the stagnation pressure in the stagnation cavity, and on the other hand extracting a gas sample may support purging the sample cavity.

In another aspect of the present disclosure a gas turbine engine is disclosed. At least one probe as described above is provided in an exhaust duct, in particular embodiments an exhaust diffuser, of the gas turbine engine. It may be provided that a multitude of probes extend radially into the exhaust duct at different angular positions. Stagnation cavities of the probes with total temperature sensors provided therein are arranged on an upstream side of the probe, wherein upstream denotes upstream with respect to the flow direction in the exhaust duct. In an embodiment a probe comprises a multitude of total temperature sensors arranged at different radial positions in the exhaust duct. In other embodiments a multitude of probes may be provided such as to provide total temperature sensors at different angular as well as radial positions of the exhaust duct such, as to be able to cover the cross section of the exhaust duct with total temperature measurements.

A plurality of probes may be provided in a duct, all of which being furnished with at least one stagnation cavity and a total temperature sensor provided therein, while all, but in certain embodiments only a part of, the probes, may be furnished with a free flow temperature sensor. This is due to the fact that for instance for thermodynamic considerations in a gas turbine engine the total enthalpy of the exhaust flow is of primary interest, and thus the total temperature. A spatially resolved measurement of the total temperature, distributed over the cross section of the exhaust duct, allows for a determination of a mean total temperature and thus a mean total enthalpy, and in turn a sound evaluation of the gas turbine thermodynamic process. The free flow temperature, in contrast, may be of a more qualitative interest in order to determine the mere occurrence of transient events. It may thus be the case that it may be found sufficient to furnish only part of the probes with a free flow temperature sensor.

It is understood that the features and embodiments disclosed above may be combined with each other. It will further be appreciated that further embodiments are conceivable within the scope of the present disclosure and the claimed subject matter which are obvious and apparent to the skilled person.

BRIEF DESCRIPTION OF THE DRAWINGS

The subject matter of the present disclosure is now to be explained in more detail by means of selected exemplary embodiments shown in the accompanying drawings. The figures show FIG. 1 an exemplary embodiment of a temperature measurement probe.

It is understood that the drawings are highly schematic, and details not required for instruction purposes may have been omitted for the ease of understanding and depiction. It is further understood that the drawings show only selected, illustrative embodiments, and embodiments not shown may still be well within the scope of the herein disclosed and/or claimed subject matter.

EXEMPLARY MODES OF CARRYING OUT THE TEACHING OF THE PRESENT DISCLOSURE

Figure 1:
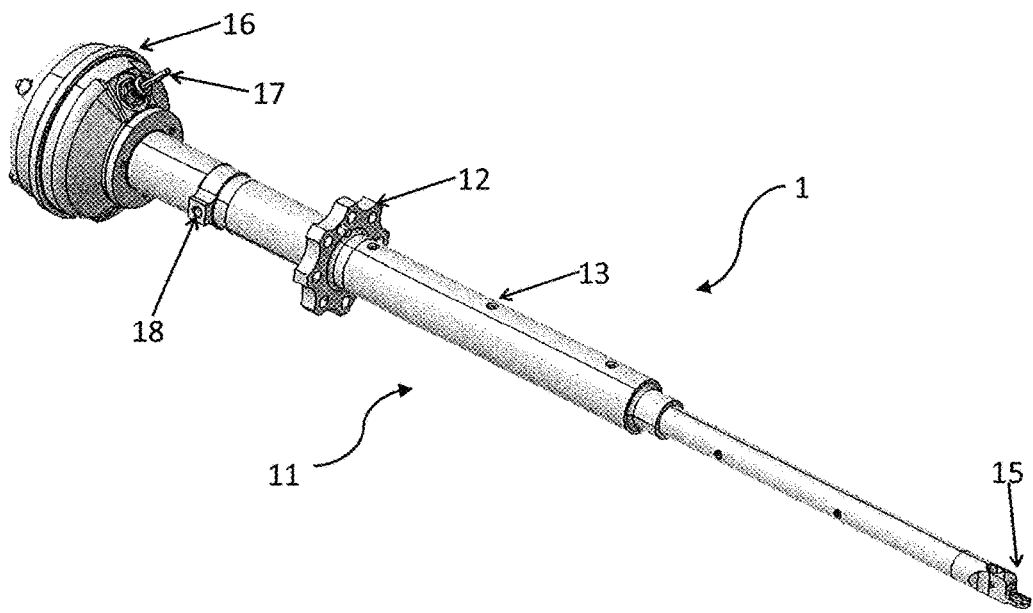

FIG. 1 depicts a general view of an exemplary embodiments of a probe as described above. Probe 1 comprises probe body 11. A flange 12 is provided in an attachment area of probe 1. Flange 12 is provided in order to attach probe 1 to a wall of a duct. Flange 12 is provided on a sleeve 13. Probe body 11 extends with a distal part from the attachment area to a distal end or tip 15 of the probe body. As will be appreciated, and lined out below in more detail, at least one total temperature sensor and one free flow temperature sensor are provided at said distal part of the probe. Proximally of the attachment area, or flange 12, respectively, the probe body extends to a proximal end, on which a terminal hosing 16 is provided. Terminal housing 16 provides a housing for, for instance, electrical connectors for transferring signals from sensors. A cable outlet 17 is provided at terminal housing 16 to provide signal cables to a suitable processing device. Further, a sample port 18 is provided on the proximal part of probe body 11 and is in fluid communication with a fluid provided around the distal part of probe body 11. Thus, when the distal part of the probe is inserted in a flue gas duct, sample port 18 may be fluidly connected to a flue gas analyzer, and flue gas from the flue gas duct may be guided to the flue gas analyzer.

Figure 2:
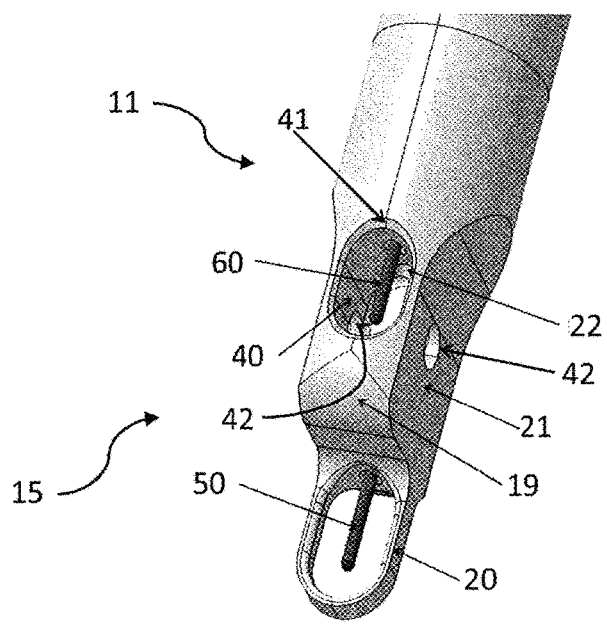
FIG. 2 a detail of the probe of FIG. 1, illustrating in more detail a distal end region of the probe.

A more detailed view of the distal end region 15 of probe body 11 is depicted in FIG. 2. A free flow temperature sensor 50 is provided at the distal end of the probe body and extends therefrom into a free flow. A protective frame 20 is provided to protect protruding free flow temperature sensor 50 from mechanical damages. Stagnation cavity 40 is provided in probe body 11. Stagnation cavity 40 is provided with a flow receiving opening on a lateral surface of probe body 11 and is delimited by edge 41. It is understood that a nominal flow direction of the probe, when the probe is inserted into a flow duct as intended, is directed towards the flow receiving opening. In other words, the probe is intended to be inserted into a flow duct such that the flow receiving opening is directed upstream the flow in the duct. In particular, the nominal, design flow direction is intended to be perpendicular to the flow receiving opening. An appropriate marking may be provided on the proximal part of the probe and/or on the terminal housing to indicate the orientation of the stagnation cavity and to allow inspection of correct positioning from outside the duct. Edge 41 delimiting the flow receiving opening is chamfered or smoothly rounded such as to avoid flow separation at edge 41 and thus a deteriorated function of stagnation cavity 40 at off-design flow conditions, and the recovery factor, which is defined as the fraction of kinetic energy converted into thermal energy due to a flow deceleration in the stagnation cavity, at certain angular deviations of the actual inflow direction from the nominal flow direction is maintained above say 0.9. For one instance, a probe is disclosed in which a recovery factor of 0.9 or larger is maintained for deviations up to ±40° or even larger from the nominal inflow direction in a cross sectional plane of the probe, wherein cross sectional denotes a plane which is perpendicular to the longitudinal extent of the probe. This is, in the shown embodiment, for an instance at least partly achieved in that the probe has a rounded cross section, and thus the receiving opening extends also to a lateral surface of the probe. For a more specific instance, the recovery factor is maintained at or above 0.9 in an at least essentially elliptic-conical inflow domain, with the short ellipse axis being oriented parallel to the probe longitudinal extent, and the long ellipse axis oriented perpendicular to the longitudinal extent, or in a cross sectional plane of the probe, respectively. The cone angle may be in one instance ±40° or even larger in the plane of the long ellipse axis, and may be ±20° or larger in the plane of the short ellipse axis. In another instance, the recovery factor may be maintained at or above 0.9 within said ranges of angular deviations, and up to Mach numbers of at least 0.6. Total temperature sensor 60 is provided inside stagnation cavity 40. If a flow of gas is directed onto the probe in the design flow direction it is decelerated at least essentially to stagnation in stagnation cavity 40. The dynamic pressure head of the flow is converted into static pressure, and the kinetic energy of the flow is converted into thermal energy. Accordingly, the temperature in stagnation cavity 40 rises above the free flow temperature and to a value representative of the specific total enthalpy of the gas. Accordingly, the temperature sensed by total temperature sensor is a temperature representative of the specific total enthalpy of the gas flow, provided the recovery factor which was briefly discussed above is sufficiently close to 1. Purge ducts 42 are provided in side walls of the stagnation cavity and open out to the exterior of probe body 11 on side walls 21 thereof. Through purge ducts 42, stagnation cavity 40 gets continuously purged at a low rate such that the gas contained in stagnation cavity 40 is continuously replaced by a certain flow of fresh gas. The throughflow cross sectional area of the purge ducts is considerably smaller than the cross sectional area of the flow receiving opening, or the stagnation cavity, respectively. As lined out above in some detail, the resulting residual speed due to purging is of inferior and disregardable quantitative influence on the temperature of the gas in stagnation cavity 40 if the purge flow is maintained sufficiently low, which can be achieved through appropriately dimensioning and positioning purge ducts 42. On the upside, purging stagnation cavity 40 with gas from the duct serves on the one hand to avoid an unreasonable delay in the measurement response on factual changes of the flow temperature, and furthermore heat conduction between the gas inside the stagnation cavity and the probe body is offset by the resulting convective heat transfer from outside the stagnation cavity. A sample extraction duct 22 is in fluid communication with stagnation cavity 40 and further in fluid communication with sample port 18 shown in connection with FIG. 1. The stagnation pressure in stagnation cavity 40 may support sample extraction through sample extraction duct 22, while extracting samples through sample extraction duct 22 supports purging of stagnation cavity 40.

It will be appreciated that fluid in stagnation cavity 40 gets replaced at a fairly low rate, such that fast changes of the temperature of the gas flow may only be detected with significant delay times, which may be too slow to use them for instance as an input for a control action. Thus, free flow temperature sensor 50 is provided protruding from the distal end 15 of probe body 11. A distal upstream face 19 of the body is aerodynamically shaped such as to avoid any stagnation or lee effects due to flow separation at the location of the free flow temperature sensor. Temperature sensor 50 is provided sufficiently distant from the body so as to place the measurement location outside any thermal or hydrodynamic boundary layer of the probe body. It is understood that protective frame 20 is provided such that an eyelet is formed in which free flow temperature sensor 50 is provided. The free cross section of the eyelet is also directed at least essentially perpendicular to the design flow direction, and protective frame 20 is provided such as not to influence the measurement of free flow temperature sensor 50. Side walls 21 of the distal end region 15 of probe body 11 are shaped such as to optimize probe tip thickness for minimizing radiation effects.

Figure 3:
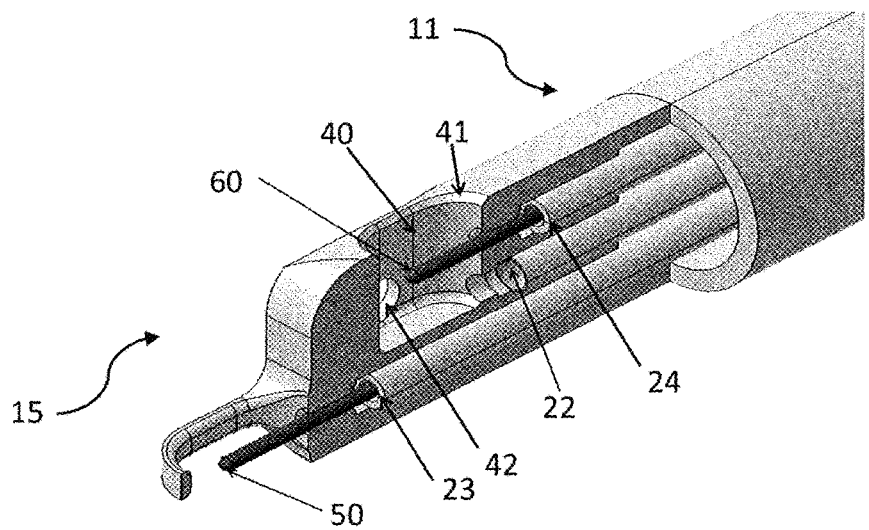
FIG. 3 a sectional view of the detail of FIG. 2.

FIG. 3 shows a sectional view of distal end 15 of probe body 11. Sensors 50 and 60 are provided on sensor shafts. The sensor shafts are disposed in sensor ducts 23, 24. Sensor ducts 23, 24 extend straight to the proximal end of the probe body. Thus upon removing or opening terminal housing 16 shown in connection with FIG. 1 the shafts on which the sensors 50, 60 are provided can be inserted or removed by a simple translation movement. It is thus possible to put a sensor in place, remove a sensor, or replace a sensor without removing the probe from a duct, that is, while the distal part of the probe body remains in the duct, and without disassembling the probe body. Any maintenance work concerning the sensors may thus be easily carried out and requires at most a very brief plant downtime.

Figure 4:
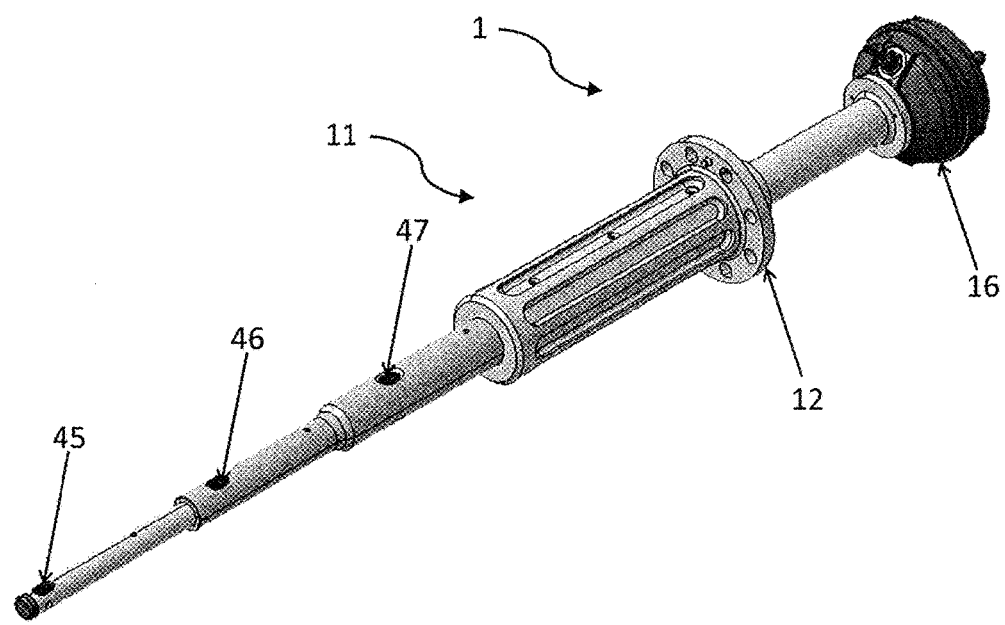
FIG. 4 a further exemplary embodiment of a temperature probe, which is a multi-sensor probe for spatially resolved total temperature measurement.

FIG. 4 depicts a further embodiment of probe 1. A plurality of for instance three stagnation cavities 45, 46, 47, with a total temperature sensor provided in each of the stagnation cavities, are provided in the probe body 11. This enables a spatially resolved measurement of a gas flow total temperature along the extent of the distal part of the probe body. Stagnation cavities 45, 46 and 47 may in particular be provided according to the design characteristics lined out in detail above. A free flow temperature sensor may be provided at the distal end of the probe body, or not. Generally, a plurality of probes may be provided in a duct, all of which being furnished with at least one stagnation cavity and a total temperature sensor provided therein, while all, but in certain embodiments only a part of, the probes may be furnished with a free flow temperature sensor. This is due to the fact that for instance for thermodynamic considerations in a gas turbine engine the total enthalpy, and thus the total temperature, of the exhaust flow is of primary and quantitative interest. A spatially resolved measurement of the total temperature, distributed over the cross section of the exhaust duct, allows for a determination of a mean total temperature and thus a mean total enthalpy, and in turn a sound evaluation of the gas turbine thermodynamic process. The free flow temperature, in contrast, is of a more qualitative interest in order to determine the occurrence of transient events. It may thus be the case that it may be found sufficient to furnish only part of the probes with a free flow temperature sensor.

While the subject matter of the disclosure has been explained by means of exemplary embodiments, it is understood that these are in no way intended to limit the scope of the claimed invention. It will be appreciated that the claims cover embodiments not explicitly shown or disclosed herein, and embodiments deviating from those disclosed in the exemplary modes of carrying out the teaching of the present disclosure will still be covered by the claims.

LIST OF REFERENCE NUMERALS 1 probe
11 probe body
12 flange
13 sleeve
15 distal end, tip, of the probe body
16 terminal housing
17 cable outlet
18 sample port
19 distal upstream face of probe body
20 protective frame
21 side wall
22 sample extraction duct
23 sensor duct
24 sensor duct
40 stagnation cavity
41 edge of stagnation cavity
42 purge duct
45 stagnation cavity
46 stagnation cavity
47 stagnation cavity
50 free flow temperature sensor
60 total temperature sensor

The invention claimed is:

1. A temperature probe for determining a temperature in a gas flow, the probe comprising:
   a probe body;
   and at least two temperature sensors wherein a first temperature sensor is provided as a free flow temperature sensor to measure a free flow temperature of the gas flow and a second temperature sensor is provided as a total temperature sensor to measure a total temperature of the gas flow:
  wherein the probe body is shaped to provide a flow stagnation area, the flow stagnation area being provided and configured to convert at least 90% of kinetic energy of an incoming flow into thermal energy, wherein the second temperature sensor is located in a gas volume in said stagnation area; and
  wherein the stagnation area is provided as a stagnation cavity in the probe body, the stagnation cavity being provided as a blind cavity and the stagnation cavity opening out to an exterior of the probe body with a flow receiving opening, the flow receiving opening being provided at one end of the stagnation cavity and a blind end being provided on an opposite end of the stagnation cavity.

2. The probe according to claim 1 wherein the first temperature sensor protrudes from a distal end of the probe body.

3. The probe according to claim 1, wherein the stagnation cavity is provided with one of a constant or tapering cross section from the flow receiving opening to the blind end.

4. The probe according to claim 1, wherein a nominal flow direction is defined perpendicular to a cross section of the flow receiving opening, at least one purge duct being provided at a lateral delimiting surface of the stagnation cavity, the purge duct being provided at an angle of at least 45° with respect to the nominal flow direction.

5. The probe according to claim 1, comprising:
  a protective frame attached to a sidewall of the probe body is provided around the first temperature sensor.

6. The probe according to claim 1, comprising:
  a sample extraction duct which extends from a proximal side of the probe body and is proximal to an attachment area, and the sample extraction duct is configured to be in fluid communication with the gas flow in which the probe is placed.

7. The probe according to claim 6, wherein the sample extraction duct is in fluid communication with the stagnation cavity.

8. The probe according to claim 1, wherein the probe body is provided as a longitudinal body, the longitudinal body comprising:
  an attachment area and an extending area that extends to a distal end along a body axis.

9. The probe according to claim 8, wherein the first temperature sensor protrudes from the distal end of the probe body.

10. The probe according to claim 8,
  wherein the flow receiving opening is provided in a lateral wall of the probe body.

11. A gas turbine engine, the gas turbine engine comprising:
  an exhaust duct; and
  a probe according to claim 1 which extends into an interior of the exhaust duct.

12. A temperature probe for determining a temperature in a gas flow, the probe comprising:
  a probe body;
  and at least two temperature sensors wherein a first temperature sensor is provided as a free flow temperature sensor to measure a free flow temperature of the gas flow and a second temperature sensor is provided as a total temperature sensor to measure a total temperature of the gas flow;
  a straight longitudinal duct extending from a proximal end of the probe body to a stagnation cavity, wherein the second temperature sensor is attached to a sensor shaft, the sensor shaft extending through the straight longitudinal duct, wherein a cross sectional dimension of the straight longitudinal duct is larger than a dimension of the second temperature sensor, and another straight longitudinal duct extends from a proximal end of the probe body to a distal end of the probe body, wherein the first temperature sensor is attached to another sensor shaft extending through the another straight longitudinal duct, wherein in a cross sectional dimension of the another straight longitudinal duct is larger than a dimension of the first temperature sensor.

13. The probe according to claim 12, wherein the first temperature sensor protrudes from the distal end of the probe body.

14. The probe according to claim 12, wherein the stagnation cavity in the probe body is a blind cavity opening out to an exterior of the probe body with a flow receiving opening, the flow receiving opening being provided at one end of the stagnation cavity and a blind end being provided on an opposite end of the stagnation cavity.

15. The probe according to claim 14, wherein a nominal flow direction is defined perpendicular to a cross section of the flow receiving opening, at least one purge duct being provided at a lateral delimiting surface of the stagnation cavity, the purge duct being provided at an angle of at least 45° with respect to the nominal flow direction.

16. The probe according to claim 12, comprising:
  a protective frame attached to a sidewall of the probe body is provided around the first temperature sensor.

17. The probe according to claim 16, wherein the probe body has an attachment area and an extending area that extends to the distal end along a body axis.

18. The probe according to claim 17, wherein the first temperature sensor protrudes from the distal end of the probe body.

19. A method of determining a temperature in a gas flow, the method comprising:
  measuring a flow temperature in a gas flow via a temperature probe, the temperature probe including:
    a probe body; and
    at least two temperature sensors wherein a first temperature sensor is provided as a free flow temperature sensor to measure a free flow temperature of the gas flow and a second temperature sensor is provided as a total temperature sensor to measure a total temperature of the gas flow;
  wherein the probe body is shaped to provide a flow stagnation area, the flow stagnation area being provided and configured to convert at least 90% of kinetic energy of an incoming flow into thermal energy, wherein the second temperature sensor is located in a gas volume in said stagnation area; and
  wherein the stagnation area is provided as a stagnation cavity in the probe body, the stagnation cavity being provided as a blind cavity and the stagnation cavity opening out to an exterior of the probe body with a flow receiving opening, the flow receiving opening being provided at one end of the stagnation cavity and a blind end being provided on an opposite end of the stagnation cavity;
  recovering the kinetic energy of the flowing gas and converting the kinetic energy into thermal energy via the gas volume of the temperature probe; and measuring a total temperature in the gas volume via the second temperature sensor.

\* \* \* \* \*